United States Patent [19]

Kroner et al.

[11] Patent Number: 5,520,834
[45] Date of Patent: May 28, 1996

[54] POLYACETALS CONTAINING ACETALDEHYDE ACETAL UNITS, PREPARATION THEREOF AND USE THEREOF IN DETERGENTS AND CLEANERS

[75] Inventors: Matthias Kroner, Eisenberg; Heinrich Hartmann, Limburgerhof; Johannes Perner; Hans-Ulrich Jaeger, both of Neustadt; Paul Diessel; Richard Baur, both of Mutterstadt; Volker Schwendemann, Neustadt, all of Germany

[73] Assignee: BASF Aktiengesellschaft, Ludwigshafen, Germany

[21] Appl. No.: 397,244

[22] PCT Filed: Sep. 25, 1993

[86] PCT No.: PCT/EP93/02613

§ 371 Date: Mar. 20, 1995

§ 102(e) Date: Mar. 20, 1995

[87] PCT Pub. No.: WO94/07939

PCT Pub. Date: Apr. 14, 1994

[30] Foreign Application Priority Data

Oct. 5, 1992 [DE] Germany ............... 42 33 340.7

[51] Int. Cl.⁶ ........................................ C11D 3/37
[52] U.S. Cl. .................. 252/89.1; 528/361; 528/392; 525/328.8; 525/328.9; 525/398; 524/745; 524/878; 252/32; 252/32.5; 252/174.23

[58] Field of Search ................... 528/361, 392; 525/398, 328.8, 328.9; 524/745, 878; 252/32, 89.1, 174.2, 32.5

[56] References Cited

U.S. PATENT DOCUMENTS 4,713,441  12/1987  Heller et al. ............... 528/392

FOREIGN PATENT DOCUMENTS 1089871  11/1967  United Kingdom .

*Primary Examiner*—Samuel A. Acquah
*Attorney, Agent, or Firm*—Oblon, Spivak, McClelland, Maier & Neustadt

[57] ABSTRACT

Soluble polyacetals containing acetaldehyde acetal units are obtainable by cationically initiated addition polymerization of (a) compounds containing at least 3 hydroxyl groups, and (b) divinyl ethers containing terminal vinyl ether groups, or mixtures of such divinyl ethers and monovinyl ethers, in the presence or absence of (c) dihydroxy compounds and/or monohydroxy compounds, and are useful as admixture in phosphate-reduced and phosphate-free detergents and cleaners and as dispersant for finely divided minerals.

6 Claims, No Drawings

POLYACETALS CONTAINING ACETALDEHYDE ACETAL UNITS, PREPARATION THEREOF AND USE THEREOF IN DETERGENTS AND CLEANERS

This application is a 371 of PCT/EP 93/02613 filed Sep. 25, 1993.

The present invention relates to soluble polyacetals which contain acetaldehyde acetal units and which are obtainable by cationically initiated polyaddition of alcohols and divinyl ethers, to a process for preparing said acetals, and to the use of the acetals in detergents and cleaners and as dispersants for finely divided minerals.

Journal of Polymer Science: Polymer Letters Edition 18 (1980), 293–297 discloses the preparation of polyacetals by acid-catalyzed addition of polyols to divinyl ethers. For instance, polyaddition of trans-1,4-cyclohexanedimethanol to butanediol divinyl ether under the catalytic effect of p-toluenesulfonic acid produces a polyacetal having a molecular weight of 200,000.

The reaction of diethylene glycol divinyl ether, bisphenol A and 1,1,1-trimethylolpropane in a molar ratio of 6:3:2 in the presence of trichloroacetic acid as catalyst produces crosslinked polyacetals. The polyacetals are used in medicine for the controlled release of active compounds.

FR-A-2 336 936 likewise discloses the preparation of crosslinked insoluble polyacetals. The crosslinked polyacetals are obtained by reaction of cyclic divinyl ethers with glycerol.

It is an object of the present invention to provide novel soluble substances based on polyols and divinyl ethers and a process for preparing the novel substances. It is a further object to describe detergent and cleaner additives which reduce the viscosity of nonionic surfactants.

We have found that these objects are achieved according to the invention by soluble polyacetals containing acetaldehyde acetal units, obtainable by cationically initiated polyaddition of (a) compounds containing at least 3 hydroxyl groups, (b) divinyl ethers containing terminal vinyl ether groups, or mixtures of such divinyl ethers and monovinyl ethers, and (c) dihydroxy compounds and/or monohydroxy compounds, the sum of the hydroxyl groups of the compounds (a) and (c) relative to the sum of the vinyl ether groups of compounds (b) being from 0.1 to 10.

The invention further provides a process for preparing water-soluble polyacetals containing acetaldehyde acetal units, which comprises reacting (a) compounds containing at least 3 hydroxyl groups, (b) divinyl ethers containing terminal vinyl ether groups, or mixtures of such divinyl ethers and monovinyl ethers, and (c) dihydroxy compounds and/or monohydroxy compounds and acid catalysts which initiate the cationic polyaddition at temperatures of from −20° to 250° C. in such ratios that the sum of the hydroxyl groups of the compounds (a) and (c) relative to the sum of the vinyl ether groups of compounds (b) being from 0.1 to 10. The soluble polyacetals are used as admixture in phosphate-reduced and phosphate-free detergents and cleaners and also as dispersant for finely divided minerals.

The reaction of the components (a) and (b) can be made to proceed without crosslinking—even in the absence of dihydroxy compounds and/or monohydroxy compounds—by ensuring that the ratio of the hydroxyl groups to vinyl ether groups in the compounds (a) and (b) is greater than unity. The crosslinking of the resulting polyacetals can also be effectively prevented by using compounds of group (c) in the polyaddition. These compounds are used in the polyaddition in such amounts that water-soluble polyacetals containing acetaldehyde acetal units are formed.

Suitable compounds of group (a), polyhydroxy compounds which contain at least 3 OH groups in the molecule, include for example glycerol, oligoglycerols having from 2 to 10 glycerol units, trimethylolpropane, erythritol, pentaerythritol, polyvinyl alcohols having molecular weights up to 100,000, polyallyl alcohols having molecular weights (number average) up to 100,000, polyhydroxymethylenes obtainable by polymerization of vinylidene carbonate, monosaccharides such as glucose, mannose, fructose, levoglucosan, disaccharides such as sucrose, lactose, maltose, leucrose, isomaltose, isomaltulose, oligo- and polysaccharides such as degraded starch, starch, inulin, fructopolysaccharides, maltodextrins, pentoses, levan, branched fructans, reduced carbohydrates such as sorbitol, mannitol, isomalt, inositol and oxidized carbohydrates which carry carboxyl groups, such as sugarcarboxylic acids, gluconic acid and mucic acid and also modified carbohydrates, such as $C_1$–$C_{20}$-alkylglucosides, such as methylglucoside, ethylglucoside, n-propylglucoside, isopropylglucoside, n-butylglucoside, isobutylglucoside, n-hexylglucoside and palmitylglucoside and levoglucan. Preferred compounds of group (a) are glucose, sucrose, alkylglucosides such as methylglucoside, dextrose, sorbitol, mannitol, erythritol and pentaerythritol.

The compounds of group (b) are divinyl ethers which contain terminal vinyl ether groups, or mixtures thereof with monovinyl ethers. Suitable divinyl ethers include for example all doubly vinylated diols, e.g. ethylene glycol divinyl ether, propylene glycol divinyl ether, butanediol divinyl ether, butynediol divinyl ether, butenediol divinyl ether, hexanediol divinyl ether, bis(hyroxymethyl)cyclohexane divinyl ether, diethylene glycol divinyl ether, triethylene glycol divinyl ether, tetraethylene glycol divinyl ether and also divinyl ethers of polyethylene glycols where the polyethylene glycol has a molecular weight of up to 20,000, polypropylene glycol divinyl ethers having molecular weights of up to 10,000 and also divinyl ethers of copolymers of polyethylene oxide and polypropylene oxide having molecular weights of up to 10,000 and also polytetrahydrofuran divinyl ether. Preferred compounds of group (b) are 1,4-butanediol divinyl ether, 1,6-hexanediol divinyl ether, ethylene glycol divinyl ether, diethylene glycol divinyl ether and triethylene glycol divinyl ether.

Suitable monovinyl ethers for use in mixture with the divinyl ethers include for example $C_1$–$C_{20}$-alkyl vinyl ethers, such as methyl vinyl ether, ethyl vinyl ether, n-propyl vinyl ether, isopropyl vinyl ether, n-butyl vinyl ether, isobutyl vinyl ether, hexyl vinyl ether, 2-ethylhexyl vinyl ether, octyl vinyl ether, decyl vinyl ether and $C_{20}$-alkyl vinyl ether. Other suitable monovinyl ethers include phenyl vinyl ether, vinyl ethers of hydroxycarboxylic esters, such as ethyl vinyloxyacetate, methyl vinyloxyacetate, ethyl vinyloxypropionate, methyl vinyloxypropionate, methyl vinyloxyvalerate, ethyl vinyloxyvalerate, dimethyl vinyloxysuccinate, methyl vinyloxystearate, trimethyl vinyloxytricarballylate, vinyl ethers of trialkyl citrates, such as the vinyl ether of trimethyl citrate and the vinyl ether of triethyl citrate. The monovinyl ethers used can also be glucals, e.g. triacetylgalactalglucal or tetrabenzyl-2-hydroxyglucal.

Further suitable monovinyl ethers are hydroxyvinyl ethers obtainable for example by vinylation of a hydroxyl group of diols. Suitable monovinyl ethers of this kind include for example butanediol monovinyl ether, hexanediol monovinyl ether, diethylene glycol monovinyl ether, triethylene glycol monovinyl ether, tetraethylene glycol monovinyl ether, pentaethylene glycol monovinyl ether and also monovinyl ethers of copolymers of ethylene oxide and propylene oxide and monovinyl ethers of polyethylene oxide and propylene oxide having molecular weights (number average) of up to 10,000.

A component (b) mixture of divinyl ethers and monovinyl ethers contains from 1 to 100, preferably from 20 to 100, mol % of divinyl ethers containing terminal vinyl ether groups.

The monomers of group (c) are dihydroxy compounds and/or monohydroxy compounds. Usable dihydroxy compounds include in principle all compounds which have 2 OH groups, for example alkylene glycols, such as ethylene glycol, diethylene glycol, triethylene glycol, tetraethylene glycol, polyethylene glycols up to molecular weights of 10,000, propylene glycol, dipropylene glycol, polypropylene glycols with molecular weights of up to 10,000, copolymers of ethylene oxide and propylene oxide and optionally butylene oxide with molecular weights of up to 10,000, polytetrahydrofuran with molecular weights of up to 10,000, 1,2-butanediol, 1,3-butanediol, 1,4-butanediol, 1,2-pentanediol, neopentylglycol, 1,5-pentanediol, 1,2-hexanediol, 1,3-hexanediol, 1,4-hexanediol, 1,5-hexanediol, 1,6-hexanediol, 1,7-heptanediol, 1,8-octanediol, 2,5-dimethyl-2,5-hexanediol, 1,4-bis-(hydroxymethyl)cyclohexane, pyrocatechol, resorcinol and hydroquinone. In addition to alkylene glycols and phenols it is also possible to use those dihydroxy compounds as monomers of group (c) which additionally carry further functional groups, for example ester, amide, nitrile, ether, acetal, imidoester, ketone, imide and thioether groups and also CC double or triple bonds. Examples of suitable compounds of this kind are dimethyl tartrate, diethyl tartrate, methyl 2,2-bis(hydroxymethyl)propionate, 3-hydroxy-2,2-dimethylpropyl hydroxypivalate, 2-butene-1,4-diol and 3-hexyne-2,5-diol, bis(2-hydroxyethyl) terephthalate, 1-phenylethylene glycol, and octadecanediol from hydrogenated castor oil. Examples of further suitable monomers of group (c) are dihydroxycarboxylic esters which can be isolated from natural fats and oils or are preparable by enzymatic, bacterial or chemical reactions. Examples of such compounds are dihydroxy fatty acids such as 10,12-dihydroxystearic acid, 9,10-dihydroxystearic acid, 9,12-dihydroxy-10-octadecenoic acid, 9,12-dihydroxy-9-oxo-10-octadecenoic acid, 10,13-dihydroxy-11-octadecenoic acid and 12,13-dihydroxy-9-oxo-10-octadecenoic acid. Dihydroxy fatty esters are also obtainable by hydroxylating and oxidizing fatty acids of natural origin, for example from ricinoleic acid, linoleic acid, oleic acid, linolenic acid, elaidic acid, palmitoleic acid, myristoleic acid, palmitic acid and stearic acid. Diols formed by elimination of water from polyols, for example dianhydrosorbitol, dianhydromannitol and dianhydroerythritol, are likewise suitable. Preferred monomers of group (c) are triethylene glycol, dimethyl tartrate and diethyl tartrate.

Suitable monohydroxy compounds of group (c), which are optionally includable in the cationically initiated polyaddition, are aliphatic and aromatic compounds which each have one hydroxyl group. The customarily envisioned hydroxyl-containing aliphatic and aromatic compounds have up to 30 carbon atoms in the molecule. These compounds may additionally contain further functional groups, for example ester, amide, nitrile, ether, acetal, amidoester, imide and thioether groups and also CC double or triple bonds. Examples of suitable compounds are monohydric $C_1$–$C_{30}$-alcohols, such as methanol, ethanol, n-propanol, isopropanol, n-butanol, isobutanol, tert-butanol, pentanols, 2-methylbutanol, 3-methylbutanol, tert-amyl alcohol, 3-methyl-3-pentanol, cyclohexanol, n-hexanol, n-octanol, isooctanol, decanol, dodecanol, stearyl alcohol and palmityl alcohol, and also oxo alcohols which are obtainable by addition of carbon monoxide and hydrogen to olefins by the oxo process, allyl alcohol, phenol, o-, m- and p-cresol, alkylphenols, benzyl alcohol, propargyl alcohol, butynol, 3-methyl-3-buten-1-ol, 3-methyl-2-buten-1-ol, 2-methyl-3-buten-2-ol, 2-methyl-3-butyn-2-ol and 1-ethynylcyclohexanol.

Further possible monomers of group (c) are reaction products of monohydric alcohols and phenols with from 1 to 100 mol of alkylene oxides. Suitable alkylene oxides are for example ethylene oxide, propylene oxide and butylene oxides. Suitable alkoxylation products are for example ethylene glycol monomethyl ether, ethylene glycol monoethyl ether, ethylene glycol monobutyl ether, propylene glycol monobutyl ether, 1,2-butylene glycol monomethyl ether, 2-(4-methoxyphenyl)ethanol, diethylene glycol monomethyl ether, diethylene glycol monoethyl ether, diethylene glycol monobutyl ether, reaction products of 1 mol of methanol with 3.9 or 25 mol of ethylene oxide, reaction products of an oxo alcohol with from 3 to 25 mol of ethylene oxide. Further suitable monofunctional alcohols are for example ethylenechlorohydrin, propylenechlorohydrin, 6-chlorohexanol, 8-chlorooctanol, methyl glycolate, ethyl glycolate, methyl lactate, ethyl lactate, isopropyl lactate, n-butyl lactate, isobutyl lactate, methyl mandelate, ethyl mandelate, hydroxypropionitrile, methyl hydroxybutyrate, ethyl hydroxybutyrate, methyl hydroxyvalerate, ethyl hydroxyvalerate, isopropyl hydroxyvalerate, methyl hydroxyisovalerate, ethyl hydroxyisovalerate, methyl hydroxyisobutyrate, ethyl hydroxyisobutyrate, methyl hydroxypivalate, ethyl hydroxypivalate, ethyl benzylate, mandelonitrile, diethyl hydroxymalonate, diethyl hydroxymethylmaleate, diethyl hydroxymethylmalonate, diethyl malate, triethyl citrate, ethyl hydroxycrotonate, dimethyl malate, trimethyl citrate, tri-n-propyl citrate, methyl hydroxycrotonate, methyl 3-hydroxy-4-hexenoate, 2-hydroxy-3,3-dimethylbutyrolactone, hydroxyacetone, glycolaldehyde, vanillin, eugenol, salicylaldehyde and acetoin.

It is also possible to use hydroxy fatty esters preparable bacterially, enzymatically or by chemical hydroxylation of oils or fats of natural origin, for example on the basis of linoleic acid, linolenic acid, oleic acid, elaidic acid, ricinoleic acid, palmitic acid and stearic acid. This produces for example methyl 10-hydroxy-12-octadecenoate, methyl 10-hydroxy-12,15-octadecadienoate, methyl 12-hydroxyoleate, methyl ricinoleate, methyl 10-hydroxyoctadecanoate, methyl 10-hydroxystearate, methyl hydroxypalmitate, methyl 10-hydroxyhexadecanoate, methyl 13-hydroxy-12,13-epoxy-10-octadecanoate, methyl 9-hydroxy-10-oxo-12-octadecenoate and methyl 13-hydroxypalmitate.

All monomers of group (c) can be used in the form of the mono-and divinyl ethers as monomers of group (b).

The monomers (a), (b) and (c) are polymerized cationically. This involves the addition of the OH group of a monomer of group (a) to a vinyl ether group of the monomer of group (b) to form an acetaldehyde acetal. This polymerization results in a polymeric main or side chain in which the monomer units are held together by acetaldehyde acetal units of the structure

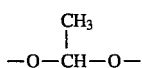

The ratio of the sum of the hydroxyl groups of compounds (a) and (c) to the sum of the vinyl ether groups of compounds (b) is customarily from 0.1:1 to 10:1, preferably from 0.5:1 to 5:1.

The cationic copolymerization of the monomers of groups (a), (b) and optionally (c) can be initiated with the aid of any organic or inorganic acidic substance. Suitable cationic initiators are for example oxalic acid, tartaric acid, adipic acid, succinic acid, succinic anhydride, citric acid, formic acid, acetic acid, propionic acid, malic acid, monohalogenated or polyhalogenated carboxylic acids, such as trifluoroacetic acid or trichloroacetic acid, hydrogen chloride, hydrogen bromide, hydrogen iodide, sulfuric acid, phosphoric acid, benzenesulfonic acid, p-toluenesulfonic acid, boric acid, ascorbic acid, acidic alumina, aluminum sulfate, potassium aluminum sulfate, iron(II) sulfate, iron(III) sulfate, aluminum oxide, titanium sulfate, iron(III) chloride, boron trifluoride, boron trichloride, boron tribromide, iodine, ion exchangers in the acid form, and acid-loaded inert solid substances. The initiators for the cationic polymerization are customarily used in amounts of from 0.001 to 20, preferably from 0.01 to 1, % by weight, based on the monomers of groups (a) and (b). The copolymerization is generally highly exothermic. Depending on the activity of the initiator used, the reaction temperatures range from −20° to 250° C., preferably from 0° to 200° C.

Soluble polyacetals containing acetaldehyde acetal units are obtainable for example by reacting the following compounds:

starch, butanediol divinyl ether, ethyl lactate,
starch, triethylene glycol divinyl ether and ethyl vinyloxyacetate,
starch, butanediol divinyl ether, triethylene glycol and ethyl lactate,
starch, butanediol divinyl ether and citric acid,
starch, butanediol divinyl ether and triethyl citrate,
degraded starch, butanediol divinyl ether and ethyl vinyloxypropionate,
degraded starch, butanediol divinyl ether, ethyl glycolate,
degraded starch, butynediol divinyl ether and ethyl vinyloxyacetate,
degraded starch, butenediol divinyl ether and hydroxybutyl vinyl ether ethoxylates,
dextrin, hydroxybutyl vinyl ether ethoxylates, triethylene glycol divinyl ether and ethyl vinyloxyacetate,
dextrin, diethyl tartrate, ethyl lactate and butanediol divinyl ether,
sucrose, butanediol divinyl ether and ethyl vinyloxyacetate,
sucrose, butanediol divinyl ether and ethyl lactate,
sucrose, triethylene glycol, butanediol divinyl ether and ethyl lactate,
sucrose, diethyl tartrate, butynediol divinyl ether and ethyl lactate,
sucrose, diethyl tartrate, butanediol divinyl ether and triethyl citrate,
sucrose, diethyl tartrate, butanediol divinyl ether and citric acid,
lactose, diethyl tartrate, butanediol divinyl ether and ethyl lactate,
lactose, ethyl vinyloxyacetate and butanediol divinyl ether,
glucose, diethyl tartrate, butanediol divinyl ether and ethyl lactate,
glucose, triethylene glycol, butanediol divinyl ether and ethyl lactate,
glucose, ethyl vinyloxyacetate and butanediol divinyl ether,
sorbitol, ethyl vinyloxyacetate and butanediol divinyl ether,
sorbitol, triethylene glycol, butanediol divinyl ether and ethyl lactate,
sorbitol, diethyl tartrate, butanediol divinyl ether and ethyl glycolate,
sorbitol, octadecyl vinyl ether and butanediol divinyl ether,
sorbitol, butanediol divinyl ether, ethyl vinyloxyacetate and octadecyl vinyl ether,
methylglucoside, ethyl vinyloxyacetate, butanediol divinyl ether and octadecyl vinyl ether,
methylglucoside, diethyl tartrate, butanediol divinyl ether and ethyl glycolate,
methylglucoside, triethylene glycol, butanediol divinyl ether and ethyl lactate,
methylglycoside, tartaric acid, butanediol divinyl ether and citric acid.

The process for preparing soluble polyacetals which contain acetaldehyde acetal units which are virtually not crosslinked comprises reacting (a) compounds containing at least 3 hydroxyl groups, and
(b) divinyl ethers containing terminal vinyl ether groups, or mixtures of such divinyl ethers and alkyl vinyl ethers, in the presence of
(c) dihydroxy compounds and/or monohydroxy compounds and acid catalysts which initiate the cationic polyaddition at temperatures of at least −20° C. in such ratios that water-soluble addition products are produced. The order in which the components are added to the reaction mixture is optional. Preference is given to initially charging the compounds of component (a) together with the initiator and adding the other reaction components in succession. For instance, 1 mol of sorbitol can be reacted first with 1 mol of ethyl vinyloxyacetate, then with 1 mol of octadecyl vinyl ether and thereafter with 1 mol of butanediol divinyl ether. However, it is also possible first to react for example 1 mol of sorbitol together with 4 mol of ethyl vinyloxyacetate and thereafter with 1 mol of butanediol divinyl ether. Another example of the preparation of the polyacetals comprises reacting a solution of methylglucoside and triethylene glycol with butanediol divinyl ether. Similarly, polyacetals are produced on reacting a solution of methylglucoside in diethyl tartrate with butanediol divinyl ether.

However, it is also possible to react a suspension of methylglucoside in diethyl tartrate or triethylene glycol with butanediol divinyl ether or to cationically polymerize methylglucoside first with ethyl vinyloxyacetate and thereafter with butanediol divinyl ether.

Similarly, solids such as starch can be included in this reaction by reacting for example starch first with ethyl vinyloxyacetate and then with butanediol divinyl ether. The reaction product can additionally be reacted with triethyl citrate, in which case this ester adds to a vinyl ether group still present in the polyacetal. Starch can also be reacted initially with butanediol divinyl ether and then with triethyl citrate or with trimethyl citrate to form polyacetals containing acetaldehyde acetal units. The reverse order is also possible by first reacting butanediol divinyl ether with triethyl or trimethyl citrate and then to react the reaction product with starch. Instead of starch it is also possible to use methylglucoside.

The compounds of group (a) are at least at higher temperatures soluble in the dihydroxy compounds of component (c). It thus depends on the temperature whether a solution or a suspension of the compound of group (a) in the dihydroxy compounds and/or monohydroxy compounds used in the reaction. For example, methylglucoside forms a completely clear solution in diethyl tartrate at 150° C., whereas at below 150° C. it dissolves only incompletely and thus forms a suspension or saturated solution. The solution or suspension is subsequently admixed and reacted with at least one compound of group (b), for example with butanediol divinyl ether.

The preparation of the soluble/uncrosslinked polyacetals requires no inert solvents. On the contrary, the compounds of group (c) can be used as diluents. Preference is given to starting from a melt, a slurry or a solution of the compounds (a) in a compound of group (c) and conducting the cationically initiated polyaddition at temperatures of at least 70° C., preferably at temperatures of above 90° C., by adding the compounds of group (b) a little at a time or continuously in the presence of cationic catalysts. The catalysts can be introduced into the reaction zone for example together with the compounds of group (c). However, it is also possible to admix the compounds which contain at least 3 hydroxyl groups (i.e. the compounds of group (a)) with the total required amount of compounds of group (b) and catalyst and heat the mixture to the reaction temperature required. The compounds of group (a) and the compound of group (b) are frequently not miscible with one another. As mentioned above, however, the cationically initiated addition reaction leads to the formation of the homogeneous reaction mixture. For example, a homogeneous, clear and colorless reaction mixture is obtained on reacting methylglucoside or sorbitol with ethyl vinyloxyacetate and 1,4-butanediol divinyl ether in the presence of catalytic amounts of oxalic acid. In this case the reaction temperatures preferably range from 110° to 170° C. The course of the addition reaction can be monitored by iodometric titration of the vinyl ether groups.

The polyacetal containing acetaldehyde acetal units have K values (determined by the method of H. Fikentscher in tetrahydrofuran at 25° C. and at a polyacetal concentration of 1% by weight) ranging from 9 to 100. They are hydrolyzable at below pH 7. Hydrolysis cleaves the acetaldehyde acetal units into acetaldehyde and other hydrolysis products. The hydrolysis products are biodegradable. The influence of carbon dioxide is enough to bring about the hydrolytic cleavage of the acetal groups in aqueous solution. The polyacetals are biodegradable. They are used as admixtures in phosphate-reduced and phosphate-free detergent and cleaner formulations and as dispersants for finely divided minerals, in particular clay minerals, titanium dioxide and chalk.

Phosphate-reduced detergents are those detergents whose phosphate content is less than 25% by weight, calculated as sodium triphosphate. The compositions of detergent and cleaner formulations can vary greatly. Detergent and cleaner formulations customarily contain from 2 to 50% by weight of surfactants with or without girders. This applies to both liquid and pulverulent detergent and cleaner formulations. Examples of the compositions of detergent formulations which are customary in Europe, the U.S. and Japan may be found for example in table form in Chemical and Eng. News, 67 (1989), 35, in WO-A-90/13581 and also in Ullmanns Encyklopädie der technischen Chemie, Verlag Chemie, Weinheim 1983, 4th edition, pages 63–160. Also of interest are those detergent formulations which contain up to 60% by weight of an alkali metal silicate and up to 10% by weight of a polyacetal produced according to the invention.

The detergents may additionally contain a bleaching agent, for example sodium perborate, which, if used, can be present in the detergent formulation in amounts of up to 30% by weight. The detergent and the cleaner formulations may contain further customary admixtures, for example complexing agents, opacifiers, optical brighteners, enzymes, perfume oils, color transfer inhibitors, grayness inhibitors and/or bleach activators and also zeolite.

The polyacetals are used in detergents in amounts from 0.5 to 20, preferably 2 to 10, % by weight.

The hydrolyzed and neutralized polyacetals are also suitable for use as dispersants for finely divided substances, for example clays, chalk, calcium carbonate, titanium dioxide, iron oxides, kaolins, aluminum oxide, cement and oxidic glazes for ceramic purposes. When used as dispersants, they are customarily required in amounts from 0.02 to 1% by weight, based on the finely divided substances.

The percentages in the Examples are by weight. The K values of the polyacetals were determined in 1% strength solution in tetrahydrofuran at 25° C. by the method of H. Fikentscher, cf. Cell. Chem. 13 (1932), 58–64, 71–74.

EXAMPLES

General method for the alkaline aftertreatment of the ester group-carrying polyacetals (preparation of aqueous sodium salt solutions):

To 30 g of polyacetal are added 150 ml of ethanol and the esters are saponified by addition of equivalent amounts of a 25% strength aqueous sodium hydroxide solution. The saponification of the ester groups is effected at a temperature of 20° C. Thereafter the ethanol is removed under reduced pressure and the resulting solution is diluted with water.

General method for preparing the polyacetals containing acetaldehyde acetal units A round-bottom flask equipped with a stirrer and with a device for working under nitrogen is charged with components (a) and (c), followed by 0.3 g of oxalic acid. The mixture is then heated to a temperature of 150° C. A homogeneous solution forms at temperatures above 150° C. 1,4-Butanediol divinyl ether (component (b)) is metered in and the reaction mixture is allowed to afterreact at 150° C. for 1 hour. The decrease in the vinyl ether group content is determined by means of the iodine titration of samples of the reaction mixture. On completion of the polyaddition the vinyl ether group content is less than 1/100 of the initial value. To stabilize the polyacetals, 2 g of solid sodium bicarbonate are powdered. Table 1 indicates the starting materials, the ratio of the hydroxyl groups to the vinyl ether groups in the starting materials, and the K values of the polyacetals obtained.

TABLE 1

| Example | Polyacetal | (a) Methylglucoside (g) | (c) Diethyl tartrate (g) | (b) Butanediol divinyl ether (g) | Ratio of OH/VE groups | K value of polyacetal |
| --- | --- | --- | --- | --- | --- | --- |
| 1 | 1 | 39 | 62 | 92 | 1.26 | 14 |
| 2 | 2 | 39 | 41 | 78 | 1.10 | 14 |
| 3 | 3 | 39 | 45[1] | 85 | 1.3 | 16 |
| 4 | 4 | 39 | 41 | 71 | 1.2 | 11 |
| 5 | 5 | 39 | 62 | 78 | 1.27 | 9 |
| 6 | 6 | 39 | 21 | 57 | 1.25 | 14 |
| 7 | 7 | 39 | 41 | 78 | 1.09 | 18 |

[1] diethyl tartrate replaced by triethylene glycol

EXAMPLE 8

Polyacetal 8 is prepared according to the general method by reacting a solution of 39.5 g (0.2 mol) of glucose, 45 g (0.3 mol) of triethylene glycol and 0.3 g of oxalic acid at 145° C. with 92 g (0.65 mol) of butanediol divinyl ether. The ratio of the OH groups to the vinyl ether groups was 1.08. The K value of polyacetal 8 is 22. Alkaline aftertreatment (cf. above) gives the sodium salt solution.

EXAMPLE 9

Polyacetal 9 is prepared according to the general method by reacting a solution of 68.5 g (0.2 mol) of sucrose, 62 g (0.3 mol) of diethyl tartrate and 0.3 g of oxalic acid at 110° C. with 78 g (0.55 mol) of butanediol divinyl ether. The K value of the polyacetal thus obtained is 10. Alkaline aftertreatment as per the above-indicated method gives the sodium salt solution. In the starting materials the ratio of the OH groups to the vinyl ether groups was 2.14.

EXAMPLE 10

Polyacetal 10 is prepared according to the above-indicated general method by reacting a solution of 68.5 g (0.2 mol) of sucrose, 45 g (0.3 mol) of triethylene glycol and 0.3 g of oxalic acid at 110° C. with 99 g (0.7 mol) of 1,4-butanediol divinyl ether. The ratio of the OH groups to the vinyl ether groups is 1.57. The polyacetal obtained has a K value of 11. Alkaline aftertreatment gives the sodium salt solution of the polyacetal.

EXAMPLES 11 TO 16

The above-indicated method is followed when a solution of ethyl lactate and butanediol divinyl ether is added to a solution or suspension of methylglucoside in diethyl tartrate containing 0.2 g of oxalic acid. The quantities used, the reaction temperature and the ratio of the OH groups to the vinyl ether groups in the starting materials is indicated in Table 2 together with the K values of the polyacetals.

TABLE 2

| Example | Polyacetal No. | (a) Methylglucoside (g) | (c) Diethyl tartrate (g) | (c) Ethyl lactate (g) | (b) Butanediol divinyl ether (g) | Temp. (°C.) | Ratio of OH/VE groups | K value |
| --- | --- | --- | --- | --- | --- | --- | --- | --- |
| 11 | 11 | 39 | 21 | 3 | 57 | 155 | 1.28 | 28 |
| 12 | 12 | 39 | 21 | 3.5 | 57 | 140 | 1.29 | 10 |
| 13 | 13 | 39 | 21 | 6 | 57 | 150 | 1.31 | 13 |
| 14 | 14 | 39 | 21 | 3.5 | 57 | 150 | 1.29 | 14 |
| 15 | 15 | 39 | 21 | 3.5 | 57 | 110 | 1.29 | 11 |
| 16 | 16 | 39 | — | 27[a] | 39 | 145 | 1.11 | 12 |

[a] diethyl lactate replaced by diethylene glycol monoethyl ether

EXAMPLES 17 TO 21

The amounts of methylglucoside and ethyl vinyloxyacetate reported in Table 3 are weighed into a round-bottom flask, admixed with from 20 to 40 mg of oxalic acid and heated at 130° C. until a homogeneous mixture has formed. Then butanediol divinyl ether is added and the reaction mixture is held at 130° C. for 1 hour. The K values of the polyacetals thus obtainable are reported in Table 3. Alkaline aftertreatment of the polyacetals with sodium hydroxide solution gives the sodium salts.

TABLE 3

| Example | Polyacetal No. | (a) Methylglucoside (mmol) | (b) Ethyl vinyloxyacetate (mmol) | (b) Butanediol divinyl ether (mmol) | Ratio of OH/VE groups | K value |
| --- | --- | --- | --- | --- | --- | --- |
| 17 | 17 | 10 | 10 | 15 | 1.0 | 12.3 |
| 18 | 18 | 10 | 10 | 16.5 | 0.93 | 9.0 |
| 19 | 19 | 10 | 7.5 | 16.25 | 0.84 | 10.1 |
| 20 | 20 | 20 | 10 | 35 | 1.0 | 11.3 |
| 21 | 21 | 20 | 5 | 37.5 | 1.0 | 30.9 |

EXAMPLE 22

The above-indicated method is followed when a solution of 3.4 g (0.01 mol) of sucrose in 2.25 g (0.015 mol) of triethylene glycol and 20 mg of oxalic acid is prepared and heated to 130° C. At that temperature 3.9 g (0.0275 mol) of 1,4-butanediol divinyl ether are added, followed by 7.15 g (0.055 mol) of ethyl vinyloxyacetate. The polyacetal obtained has a K value of 15.6. Alkaline aftertreatment converts the polyacetal into its sodium salt form. The ratio of OH groups to vinyl ether groups was 1.0.

EXAMPLE 23

The above-indicated method is followed when a solution of 2 g (0.01 mol) of dextrose in 2.25 g (0.015 mol) of triethylene glycol and 20 mg of oxalic acid is prepared and heated to 130° C. At that temperature a mixture of 2.8 g (0.02 mol) of 1,4-butanediol divinyl ether and 5.2 g (0.04 mol) of ethyl vinyloxyacetate is added. The ratio of OH groups to vinyl ether groups in the starting materials is 1.03. The polyacetal obtained has a K value of 11. Alkaline aftertreatment converts the polyacetal into its sodium salt form.

EXAMPLE 24

The above-indicated method is followed when a solution of 2.0 g (0.01 mol) of dextrose in 2.25 g (0.015 mol) of triethylene glycol is prepared and admixed with 20 mg of oxalic acid. The reaction mixture is heated to 130° C. and admixed at that temperature with a mixture of from 3.55 g (0.025 mol) of 1,4-butanediol divinyl ether and 3.9 g (0.03 mol) of ethyl vinyloxyacetate. The polyacetal obtained has a K value of 13.2. Alkaline aftertreatment with sodium hydroxide solution converts it into its sodium salt form.

EXAMPLE 25

A mixture of 18.2 g (0.1 mol) of sorbitol, 0.15 g of oxalic acid and 13 g (0.1 mol) of ethyl vinyloxyacetate is heated to 110° C. and stirred at that temperature for 2 hours. In the course of this period, the initially diphasic reaction mixture is converted into a homogeneous reaction product. Then 14.2 g (0.1 mol) of butanediol divinyl ether are added, followed after 1 hours reaction time by 28 g (0.1 mol) of octadecyl vinyl ether, and the reaction mixture is then additionally stirred at 110° C. for 1 hour. Thereafter the vinyl ether group content is 0.0003 mol. Alkaline aftertreatment gives the sodium salt. It has surfactant properties.

USE TESTS

Clay dispersion (CD)

The clay employed as a model of particulate soils is finely ground china clay SPS 151. 1 g of said clay is intensively dispersed for 10 minutes in 98 ml of water in a 100 ml cylinder in the presence of 1 ml of a 0.1% strength sodium salt solution of the polyelectrolyte. Immediately after the stirring has been stopped, a sample of 2.5 ml is removed from the center of the cylinder, diluted with 25 ml and measured in a turbidimeter. After this dispersion has stood for 30 and 60 minutes, further samples are taken and again measured in the turbidimeter. The turbidity of the dispersion is reported in nephelometric turbidity units (NTUs). The less the dispersion settles on storage, the higher the measured turbidity values and the more stable the dispersion. The second physical parameter determined is the dispersion constant τ, which describes the time course of the sedimentation process. Since the sedimentation process approximates to a monoexponential time law, τ indicates the time within which the turbidity decreases to 1/e-th of the original level at t=0.

The higher the value of τ, the slower the rate of sedimentation in the dispersion.

TABLE 4

| Example | Polyacetal No. | NTUs after storage at once | 30 min | 60 min | Dispersion constant τ (min) |
| --- | --- | --- | --- | --- | --- |
| 26 | 1 | 700 | 520 | 480 | 221 |
| 27 | 2 | 680 | 450 | 410 | 176 |
| 28 | 11 | 650 | 410 | 370 | 157 |
|  | Comp. Ex. 1 without polyacetal | 600 | 37 | 33 | 41 |

The above-described polyacetals can be used as viscosity reducers for surfactants. Diluting concentrated, low-water or water-free surfactant formulations with water, as is customary in the sector of commercial laundry or in the production of detergent formulations, frequently gives rise to a concentration range having a very high viscosity. This frequently causes problems with the transport of the formulations in pipework, the metering by means of pumps and the rate of dissolution in the wash liquor. A high viscosity necessitates a high level of mechanical energy for processing the surfactants. Moreover, the high viscosity of the partially diluted surfactant means that the continued process of dissolution of the surfactant will take longer. The increase in the viscosity of surfactants on dilution with water is observed in particular in the case of nonionic surfactants, especially in the case of polyalkoxylated compounds. If the surfactants are admixed with the above-described polyacetals in amounts from 0.1 to 50, preferably from 0.5 to 10, % by weight, the viscosity of such mixtures at dilution can be distinctly reduced. The polyacetals to be used according to the invention in detergents are preferably first dissolved or dispersed in the concentrated surfactant. Thereafter the mixture is diluted with water. The surfactant concentrate admixed with the polyacetals to be used according to the invention can also be introduced into an aqueous wash liquor. However, it is also possible to admix an already water-admixed highly viscous dilute aqueous surfactant solution with the polyacetals to be used according to the invention in order that the viscosity may be subsequently reduced.

EXAMPLES 29 TO 34

The polyacetals reported in Table 5 are tested in respect of their suitability for use as flow improvers for nonionic surfactants by preparing a mixture of an anhydrous surfactant and the polyacetals reported in Table 5. The surfactant used was an addition product of 7 mol of ethylene oxide with 1 mol of a $C_{13}/C_{15}$-alcohol mixture. The proportion of polyacetal in the mixture was 5%. Table 5 indicates the viscosities of the mixture of the abovementioned surfactant and the polyacetals at different water contents. As the Table reveals, the polyacetals described therein act as viscosity reducers for the water-containing surfactant.

TABLE 5

Flow improvers for nonionic surfactants
Viscosity measurements as a function of surfactant content

| | | Viscosity [mPas] of aqueous surfactant mixture having a nonionic surfactant content of | | | |
|---|---|---|---|---|---|
| Example | Polyacetal No. | 80% | 60% | 40% | 20% |
| 29 | 5 | 92 | 6050 | 486 | 169 |
| 30 | 6 | 90 | 6210 | 591 | 172 |
| 31 | 7 | 106 | 3560 | 356 | 287 |
| 32 | 13 | 148 | 4120 | 412 | 250 |
| 33 | 14 | 121 | 3840 | 671 | 262 |
| 34 | 15 | 158 | 3670 | 651 | 281 |
| | Comp. Ex. No. 2 without polymer | 46000 | 25000 | 158000 | 1000 |

EXAMPLES 35 TO 37

Owing to their viscosity-reducing effect, the polymers to be used according to the invention are important auxiliaries in the manufacture of phosphate-reduced and phosphate-free detergent and cleaner formulations. By using these auxiliaries it is possible to raise the slurry concentration in the Crutcher to at least 80%. This makes for better economics through better utilization of the spray drying tower and for an energy saving, since less water needs to be evaporated. The homogenizing and viscosity-reducing effect of the polymers to be used according to the invention is illustrated in what follows by viscosity measurements on detergent formulations. The measuring equipment used is a rheometer from Physika. The measuring system is a Z 3 DIN type. The detergent slurry used contains 80% by weight of detergent components and 20% by weight of water. Viscosity-reducing additives used are the polyacetals reported in Table 6, in an amount of 2% by weight, based on the detergent formulation.

The detergent for the slurry has the following composition:

10% by weight of dodecylbenzenesulfonate in the form of the sodium salt

6% by weight of surfactant (addition product of 7 mol of ethylene oxide with 1 mol of a $C_{13}/C_{15}$-alcohol mixture)

30% by weight of zeolite A

10% by weight of sodium carbonate

5% by weight of sodium metasilicate with $5H_2O$, and

39% by weight of sodium sulfate.

All the above-listed detergent components and each of the polyacetals listed in Table 6 were stirred at 60° C. by means of a wing stirrer into water so that a mixture consisting of 80 parts by weight of the above-described detergent components, 18 parts by weight of water, and 2 parts by weight of polyacetal was formed. The viscosities of the slurries were measured at 20° C. and a shear rate of 45 seconds$^{-1}$. The results are reported in Table 6.

It is clear from the measurements reported in Table 6 that the polyacetals have a homogenizing and viscosity-reducing effect on the detergent slurries.

TABLE 6

Flow improvers for detergent slurries

| Example | Polyacetal | Viscosity (mPas) | Visual appearance of slurry |
|---|---|---|---|
| 35 | 3 | 156 | Low in viscosity, homogeneous |
| 36 | 4 | 172 | Low in viscosity, homogeneous |
| 37 | 12 | 113 | Low in viscosity, homogeneous |
| | Comp. Ex. No. 3 without polymer | 28700 | Very pasty, not homogeneous |

We claim:

1. Soluble polyacetals containing acetaldehyde acetal units, prepared by reacting (a) compounds containing at least 3 hydroxyl groups, (b) divinyl ethers containing terminal vinyl ether groups, or mixtures of such divinyl ethers and monovinyl ethers, and (c) dihydroxy compounds and/or monohydroxy compounds, with acid catalysts which initiate the cationic polyaddition at temperatures of from −20° to 250° C., the ratio of the sum of the hydroxyl groups of compounds (a) and (c) to the sum of the vinyl ether groups of compounds (b) being from 0.1:1 to 10:1.

2. Soluble polyacetals containing acetaldehyde acetal units as claimed in claim 1, wherein the ratio of the sum of the hydroxyl groups of compounds (a) and (c) to the sum of the vinyl ether groups of compounds (b) is from 0.5:1 to 5:1.

3. A process for preparing water-soluble polyacetals containing acetaldehyde acetal units, which comprises reacting (a) compounds containing at least 3 hydroxyl groups, (b) divinyl ethers containing terminal vinyl ether groups, or mixtures of such divinyl ethers and monovinyl ethers, and (c) dihydroxy compounds and/or monohydroxy compounds and acid catalysts which initiate the cationic polyaddition at temperatures of from −20° to 250° C. in such ratios that the ratio of the sum of the hydroxyl groups of compounds (a) and (c) to the sum of the vinyl ether groups of compounds (b) being from 0.1:1 to 10:1.

4. A phosphate-reduced or phosphate free detergent comprising soluble polyacetals containing acetaldehyde acetal units, prepared by reacting (a) compounds containing at least 3 hydroxyl groups, (b) divinyl ethers containing terminal vinyl ether groups, or mixtures of such divinyl ethers and monovinyl ethers, and (c) dihydroxy compounds and/or monohydroxy compounds, with acid catalysts which initiate the cationic polyaddition at temperatures of from −20° to 250° C., the ratio of the sum of the hydroxyl groups of compounds (a) and (c) to the sum of the vinyl ether groups of compounds (b) being from 0.1:1 to 10:1.

5. Dispersants for finely divided minerals comprising soluble polyacetals containing acetaldehyde acetal units, prepared by reacting (a) compounds containing at least 3 hydroxyl groups, (b) divinyl ethers containing terminal vinyl ether groups, or mixtures of such divinyl ethers and monovinyl ethers, and (c) dihydroxy compounds and/or monohydroxy compounds, with acid catalysts which initiate the cationic polyaddition at temperatures of from −20° to 250° C., the ratio of the sum the hydroxyl groups of compounds (a) and (c) to the sum of the vinyl ether groups of compounds (b) being from 0.1:1 to 10:1.

6. A viscosity reducer for surfactants comprising soluble polyacetals containing acetaldehyde acetal units, prepared by reacting (a) compounds containing at least 3 hydroxyl groups, (b) divinyl ethers containing terminal vinyl ether groups, or mixtures of such divinyl ethers and monovinyl ethers, and (c) dihydroxy compounds and/or monohydroxy compounds, with acid catalysts which initiate the cationic polyaddition at temperatures of from −20° to 250° C., the ratio of the sum of the hydroxyl groups of compounds (a) and (c) to the sum of the vinyl ether groups of compounds (b) being from 0.1:1 to 10:1.

* * * * *